United States Patent [19]

Burch, Jr.

[11] Patent Number: 5,093,436
[45] Date of Patent: Mar. 3, 1992

US005093436A

[54] HALOGENATED AROMATIC POLYAMIDE ANION

[75] Inventor: Robert R. Burch, Jr., Exton, Pa.

[73] Assignee: E. I. Du Pont de Nemours and Company, Wilmington, Del.

[21] Appl. No.: 545,039

[22] Filed: Jun. 28, 1990

[51] Int. Cl.$^5$ .............................................. C08G 69/48
[52] U.S. Cl. .................................... 525/420; 524/606
[58] Field of Search ......................... 525/420; 524/606

[56] References Cited

U.S. PATENT DOCUMENTS 4,785,038  11/1988  Sweeny .............................. 524/173
4,824,881  4/1989  Kim et al. ............................ 524/82

FOREIGN PATENT DOCUMENTS 45-018875  6/1970  Japan .
46-012476  3/1971  Japan .
46-012745  4/1971  Japan .

OTHER PUBLICATIONS

J. F. Bunnett and B. F. Hrutfiord, J. Am. Chem. Soc., vol. 83, pp. 1691–1697 (1961).
M. I. El-Sheikh et al., J. Org. Chem., vol. 46, pp. 3256–3259 (1981).
E. M. Pearce, J. Polym. Sci., Polym. Chem. Ed., vol. 22, pp. 3999–4009 (1984).
E. M. Pearce, J. Polym. Sci., Polym. Chem. Ed., vol. 19, pp. 2835–2840 (1981).
E. M. Pearce, J. Polym. Sci., Polym. Chem. Ed., vol. 22, pp. 847–850 (1984).
E. M. Pearce, J. Polym. Sci., Part A, vol. 25, pp. 171–180 (1987).
E. M. Pearce, J. Polym. Sci., Polym. Chem. Ed., vol. 22, pp. 3989–3998 (1984).
M. Takayanagi and T. Katayose, J. Polym. Sci., Polym. Chem. Ed., vol. 19, pp. 1133–1145 (1981).
M. Takayanagi and T. Katayose, J. Polym. Sci., Polym. Chem. Ed., vol. 21, pp. 31–39 (1983).
R. R. Burch, et al., Macromolecules, vol. 23, pp. 1065–1072 (1990).

Primary Examiner—Harold D. Anderson

[57] ABSTRACT

This invention relates to a process for making polymers containing benzoxazole groups by heating, and thereby dehalogenating, novel anions of orthohalogenated aromatic amide groups of a polyamide. The products are useful as fibers and films.

20 Claims, No Drawings

HALOGENATED AROMATIC POLYAMIDE ANION

FIELD OF THE INVENTION

This invention concerns a process for making polymers containing benzoxazole groups by dehalogenating novel anions of ortho-halogenated aromatic amide groups of a polyamide.

BACKGROUND OF THE INVENTION

J. F. Bunnett and B. F. Hrutfiord, J. Am. Chem. Soc., vol. 83, pp. 1691–1697 (1961) report that ortho-halo substituted anilides, in contact with potassium amide in liquid ammonia, form benzoxazoles. It is postulated that the active intermediate has a negative charge on the amido oxygen. No polymers are used or mentioned in this paper.

M. I. El-Sheikh, et. al., J. Org. Chem., vol. 46. pg. 3256–3259 (1981), report results similar to those of Bunnett, supra, but report the product is formed via an o-hydroxyphenyl amidine, which is thermally unstable and on heating gives the benzoxazole. Again, no polymers are used or mentioned.

E. M. Pearce and coworkers in a series of papers (J. Polym. Sci., Polym. Chem. Ed., vol. 22, pg. 3999–4009 (1984); J. Polym. Sci., Polym. Chem. Ed., vol. 19, pg. 2835–2840 (1981); J. Polym. Sci., Polym. Chem. Ed., vol. 22, pg. 847–850 (1984); J. Polym. Sci., Part A, vol. 25, pg. 171–180 (1987); J. Polym. Sci., Polym. Chem. Ed., vol. 22, pg. 3989–3998 (1984); all of which are hereby included by reference) report the thermal decomposition of halogenated aromatic polyamides. When the halogen atom is ortho to the nitrogen atom of the amide, benzoxazoles are shown to be formed. This reaction is strictly thermal, and occurs during decomposition of the polymer, so is difficult to control and of little use for synthetic purposes.

A similar thermal reaction is reported in Japanese Patent 70018875, by heating certain aromatic polyamides in vacuum or under a stream of ammonia.

Another thermal reaction to produce polybenzoxazoles is reported in Japanese Patent 71012745. Halogenated polyamides are heated at 50°–400° C., preferably 200°–400° C., optionally in the presence of a dehydrating agent, to produce the benzoxazole. A similar process is reported in Japanese Patent 71012476.

Polyamide anions are known in the art, for example see M. Takayanagi and T. Katayose, J. Polym. Sci., Polym. Chem. Ed., vol. 19, pg. 1133–1145 (1981); M. Takayanagi and T. Katayose, J. Polym. Sci., Polym. Chem. Ed., vol. 21, pg. 31–39 (1983); R. R. Burch, et.al., Macromolecules, vol. 23, pg. 1065–1072 (1990); and U.S. Pat. Nos. 4,785,038 and 4,824,881. None of these references suggests the synthesis of ortho-halo substituted aromatic amides, or any uses for such compounds.

It is the purpose of the present invention to provide a simple, controllable and high yield method for the conversion of halogenated polyamides to benzoxazoles. To accomplish this, novel halogenated polyamide anions are provided.

SUMMARY OF THE INVENTION

This invention concerns a process for the production of benzoxazole containing polymers, comprising, heating to at least 100° C., for a period of time sufficient to produce the benzoxazole group, a polyamide anion comprising units of the formula

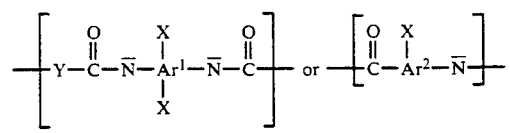

wherein:
each Y is independently hydrocarbylene or substituted hydrocarbylene;
each X is independently fluorine, chlorine, bromine or iodine;
$Ar^1$ is a tetravalent aromatic group in which each amido nitrogen is ortho to at least one of said X;
$Ar^2$ is a trivalent aromatic group in which the amido nitrogen is ortho to X; and
provided that when X is chlorine, cuprous ion is present.

This invention also concerns a polyamide anion comprising units of the formula

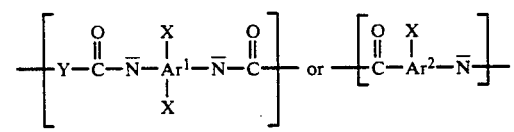

wherein:
each Y is independently hydrocarbylene or substituted hydrocarbylene;
each X is independently fluorine, chlorine, bromine or iodine;
$Ar^1$ is a tetravalent aromatic group in which each amido nitrogen is ortho to at least one of said X; and
$Ar^2$ is a trivalent aromatic group in which the amido nitrogen is ortho to X.

DETAILS OF THE INVENTION

The polyamide anion of the present invention is made from the corresponding polyamide by removal of the protons on the amido nitrogen atoms by a base. Such reactions are well known to those skilled in the art, and are described in M. Takayanagi and T. Katayose, J. Polym. Sci., Polym. Chem. Ed., vol. 19, pg. 1133–1145 (1981); M. Takayanagi and T. Katayose, J. Polym. Sci., Polym. Chem. Ed., vol. 21, pg. 31–39 (1983); R.R. Burch, et. al., Macromolecules, vol. 23, pg. 1065–1072 (1990); and U.S. Pat. Nos. 4,785,038 and 4,824,881, which are all hereby included by reference. The polyamide anions are usually prepared in solution in which the polymer is soluble. Polymers that are not soluble in organic solvents may be contacted with a base soluble in a solvent to effect dissolution of the polyamide anion. Particularly useful solvents include dialkyl sulfoxides in which the1alkyl groups contain no more than 4 carbon atoms apiece, and especially dimethylsulfoxide (herein DMSO). The base must be strong enough to remove the proton from the amido nitrogen atom. These factors are discussed and disclosed in the above mentioned references.

The polyamides from which the polyamide anions are made, and the monomers from which the polyamides are made are known. For example, the preparation of fully aromatic polyamides containing halogen atoms in the correct positions, and the monomers from which the polymers are made, are described by Pearce and coworkers, supra. For polyamide synthesis see also J. Preston in H. Mark, et. al., Ed., Encyclopedia of Polymer Science and Engineering, 3rd Ed., vol. 11, John Wiley & Sons, New York, 1988, pg. 381–409, which is hereby included by reference.

The polyamide anions may contain other monomer units, such as n-alkylated amides which do not form amide anions. The polyamide anions may contain monomer units that are not halogenated, so that these units do not form benzoxazoles. Also the polyamide anions may be fully deprotonated, that is all amido protons removed, or only partially deprotonated, only some fraction of the amido protons removed.

The group $Ar^1$ is a tetravalent aromatic group, that is a group in which there are 4 free valencies to the carbon atoms of aromatic rings. Two of these free valencies are bound to the amido nitrogen atoms, and two to the groups X. A nitrogen atom must be bound to a carbon atom adjacent (ortho) to a carbon atom bearing the X group. Thus it can be said that there are one or two amido nitrogen-halogen "pairs". These pairs may be bonded to the same or different aromatic rings. Thus the $Ar^1$ moiety may contain one or more aromatic rings. The rings may be fused to each other, as in naphthalene, connected by a covalent bond, as in biphenyl, or connected by some other inert (to reaction conditions) group, such as in diphenyl ether, 2,2-diphenylpropane, diphenylsulfone, and 1,2-diphenylethane. The $Ar^1$ moiety may contain both fused and unfused aromatic rings. A preferred $Ar^1$ is derived from benzene, and particularly preferred $Ar^1$ groups, showing the positions of associated groups, (the amido nitrogen and X groups) are

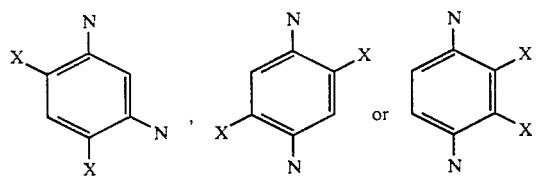

An especially preferred $Ar^1$ and associated groups is

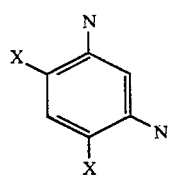

The group $Ar^2$ is a trivalent aromatic group, that is a group in which there are 3 free valencies to the carbon atoms of the aromatic rings. The amido nitrogen atom must be bound to a carbon atom ortho to the carbon atom to which the group X is bound. The $Ar^2$ moiety may contain one or more aromatic rings. The rings may be fused to each other, as in naphthalene, connected by a covalent bond, as in biphenyl, or connected by some other inert (to reaction conditions) group, such as in diphenyl ether, 2,2-diphenylpropane, diphenylsulfone, and 1,2-diphenylethane. The $Ar^2$ moiety may contain both fused and unfused aromatic rings. A preferred $Ar^2$ group is derived from benzene, and particularly preferred $Ar^2$ showing the positions of the associated groups (amido nitrogen, carbonyl carbon atom and X group) are

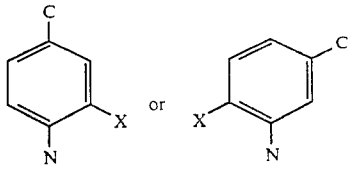

The group Y is hydrocarbylene or substituted hydrocarbylene. By "substituted hydrocarbylene" is meant a hydrocarbylene group that has substituents that do not make the polyamide anion unstable or interfere with any reactions the polyamide anion undergoes. Suitable substituents include, but are not limited to, alkyl, aryl, ether, thioether, and alkenyl A preferred group Y is arylene, and especially preferred groups Y are p-phenylene and m-phenylene. By "arylene" is meant a moiety containing two free valencies to the carbon atoms of aromatic rings. The arylene moiety may contain one or more aromatic rings. The rings may be fused to each other, as in naphthalene, connected by a covalent bond, as in biphenyl, or connected by some other inert (to reaction conditions) group, such as diphenyl ether, 2,2-diphenylpropane, diphenylsulfone, and 1,2-diphenylethane. The arylene moiety may contain both fused and unfused aromatic rings. The free valencies of the arylene moiety may be in the same or different rings. Another preferred group Y is normal alkylene.

Any stable positive counterion for the polyamide anion may be present, but alkali metal ions and cuprous ion are preferred, and lithium is especially preferred.

The group X is fluorine, chlorine, bromine or iodine, and preferred X groups are chlorine and fluorine.

The process for producing polybenzoxazoles consists of heating the above polyamide anion to effect formation of the benzoxazole groups. Preferred structures of the polyamide anion used in this process are the same as the preferred structures described above. The preferred counterions mentioned above are also the preferred counterions for the process.

The polyamide anion is heated at a temperature above about 100° C., preferably about 150° C. to about 400° C., and more preferably about 180° C. to about 200° C. Reaction times necessary to form the polybenzoxazoles will vary according to the particular reactants used, and whether a catalyst is present, but typically will be about 4 hr to about 72 hr at about 190° C. Of course the reaction will take longer at lower temperatures, and less time at higher temperatures. It is not necessary to convert all sites that could form benzoxazoles to benzoxazoles, but it is preferred that at least 80% of such sites, and more preferably 90% of such sites, are converted to benzoxazoles. If the polyamide anion is only partially deprotonated, only as many sites corresponding to the amount of deprotonation can form the benzoxazole group.

It is preferred to carry out the process in solution. Preferred solvents are dialkyl sulfoxides wherein the alkyl groups contain 4 carbon atoms or less each, and a particularly preferred solvent is DMSO. DMSO is also convenient, since the reaction can be run, and the temperature controlled at, the reflux temperature of DMSO. When DMSO is used as the solvent, the resulting polybenzoxazole often precipitates from solution as the process proceeds.

When the X group present in the polyamide anion is chlorine, cuprous ion should be present to catalyze the formation of the benzoxazole groups. The cuprous ion may derive directly from preparation of the polyamide anion, i.e., the cuprous salt may be made directly, or if there is another counterion present from the preparation of the polyamide anion, the cuprous ion may be added as a salt soluble in the solvent.

There are many possible combinations of X groups, $Ar^1$ and $Ar^2$ groups, and counterions, and in order to scout which combinations and reaction conditions are best, it is often easier to use "model" compounds to carry out such studies, rather than synthesize many different polymers. Such model compound reactions, illustrating some combinations, are given herein as Experiments, before the Examples. The Examples also illustrate some combinations and reaction conditions.

It is preferred if the reaction is agitated. It is also preferred if oxygen and moisture are not present during the process. It is convenient to exclude moisture and oxygen by using an inert atmosphere, such as nitrogen or argon.

Polymers containing benzoxazole groups are known in the art, and are useful for fibers and films, which are used are reinforcements in composites, and in woven fabrics, membranes and cables. For a more complete description of such polymers, see J. F. Wolfe in H. Mark, et. al., ed., Encyclopedia of Polymer Science and Engineering, 3rd Ed., vol. 11, John Wiley & Sons, New York, 1988, pg. 601–635, which is hereby included by reference.

EXPERIMENTS

EXPERIMENT 1

Reaction of Dibenzoyl-2,5-dichloro-p-phenylene Diamine as the Neutral Compound

One g of dibenzoyl-2,5-dichloro-p-phenylene diamine was refluxed in DMSO under nitrogen for four hours and then cooled to room temperature. Infrared and mass spectrometry analysis of the precipitate showed no evidence for benzoxazole formation under these conditions.

EXPERIMENT 2

Reaction of the Dianion of Dibenzoyl-2,5-dichloro-p-phenylene Diamine as the Di-Potassium Salt One g (2.6 mmol) of dibenzoyl-2,5-dichloro-p-phenylene diamine was reacted with 0.65 g (5.2 mmol) of KH as a 35 wt. % suspension in mineral oil in 50 mL of DMSO to give the dianion of the model compound as the di-potassium salt. The mineral oil was extracted from the reaction solution with hexane. The solution was then refluxed under nitrogen for four hours, and then cooled to room temperature. Little or no precipitate formed. Water was added to precipitate the model compound. Infrared and mass spectrometry showed that this was starting material with only a trace of benzoxazole.

EXPERIMENT 3

Reaction of the Dianion of Dibenzoyl-2,5-dichloro-p-phenylene Diamine as the Di-Lithium Salt Two g (5.2 mmol) of dibenzoyl-2,5-dichloro-p-phenylene diamine was reacted with 0.56 g (11.0 mmol) of LiNMe$_2$ in 50 mL of DMSO to give the corresponding dianion as the di-lithium salt. The resulting solution was then refluxed for 20 hours under nitrogen. Little or no precipitate formed. The product was then precipitated by addition of water. Infrared analysis of the product provided no evidence for benzoxazole.

EXPERIMENT 4

Reaction of the Dianion of Dibenzoyl-2,5-dichloro-p-phenylene Diamine as the Di-Copper(I) Salt Three-tenths g (0.78 mmol) of dibenzoyl-2,5-dichloro-p-phenylene diamine was reacted with 0.3 g (1.56 mmol) of copper di-N-butyl amide in 10 mL of DMSO to give the corresponding dianion as the di-copper salt. The resulting solution was then refluxed for four hours. The solution was allowed to cool to room temperature, and a large amount of insoluble dark solids were evident. These were isolated by filtration, washed with water and acetone and dried. Mass spectrometry and infrared analysis showed that this was the bibenzoxazole as the trans isomer with no evidence for unconverted amide bonds. Infrared analysis of the DMSO supernatant showed that this contained unconverted amides. Continued reflux improved the conversion.

EXPERIMENT 5

Reaction of the Dianion of Dibenzoyl-2,5-dichloro-p-phenylene Diamine as the Di-Potassium Salt with Added Cuprous Bromide Two g (5.2 mmol) of dibenzoyl-2,5-dichloro-p-phenylene diamine was reacted with 1.2 g (10.4 mmol) of KH as a 35 wt. % suspension in mineral oil in 50 mL of DMSO to give the dianion of the model compound as the di-potassium salt. The mineral oil was extracted from the reaction solution with pentane. Then 1.49 g (10.4 mmol) of cuprous bromide was added as a solid to the reaction solution. The resulting solution was refluxed under nitrogen for 48 hours. Upon cooling a large amount of precipitate formed, which was isolated by filtration, washed with water and acetone, and dried. Infrared spectroscopy and mass spectrometry showed that this was the bibenzoxazole as the trans isomer. Yield: 1.08 g, 66%.

EXPERIMENT 6

Reaction of the Dianion of Dibenzoyl-2,4-difluoro-m-phenylene Diamine as the Di-Lithium Salt One g (2.84 mmol) of dibenzoyl-2,4-difluoro-m-phenylene diamine was reacted with 0.29 g (5.68 mmol) of LiNMe$_2$ in 50 mL of DMSO. The resulting solution was refluxed under nitrogen for 24 hours. Upon cooling to room temperature a large amount of white crystalline material precipitated and was isolated by filtration and washed with water and acetone and finally dried. Infrared analysis and mass spectrometry showed that this was the bibenzoxazole as the cis-isomer, with no evidence for unreacted amide bonds. Yield: 0.67 g, 76%. Infrared analysis of the supernatant showed that it contained unreacted starting material.

EXPERIMENT 7

Reaction of the Dianion of Dibenzoyl-2,4-difluoro-m-phenylene Diamine as the Di-Potassium Salt One g (2.84 mmol) of dibenzoyl-2,4-difluoro-m-phenylene diamine was reacted with 0.65 g (5.68 mmol) of KH as a 35 wt. % suspension in mineral oil to give the dianion of the model compound as the di-potassium salt. The mineral oil was extracted from the reaction solution with pentane. The solution was then refluxed for 5 hours and cooled to room temperature to precipitate light colored crystals, which were isolated by filtration, washed with water and acetone and dried. Infrared analysis and mass spectrometry showed that this was the bibenzoxazole as the cis-isomer, with no evidence for unreacted amide bonds. Yield: 0.5 g, 57%.

EXAMPLES

EXAMPLE 1

Reaction of the Polyanion of Poly-2,5-dichloro-p-phenylene Terephthalamide with Copper(I)

Four g poly-2,5-dichloro-p-phenylene terephthalamide was reacted with 3.0 g of KH as a 35 wt. % suspension in mineral oil in 300 mL of DMSO to give the polyanion. The mineral oil was extracted from the reaction solution with pentane before the polymer was added. Separately 5.37 g copper(I) bromide dimethyl sulfide complex was dissolved in 150 mL DMSO. This solution was added dropwise with stirring to the polymer solution over the course of about 30 min, during which time the solution gelled. The resulting mixture was refluxed under nitrogen for 25 hours. The reaction was allowed to cool to room temperature, and the solids were broken up and isolated by filtration. These were rinsed with water and placed in a Soxhlet extractor and continuously extracted with water for 24 hours. The solids were collected and rinsed with acetone and dried. The solids were soluble in concentrated sulfuric acid. Yield: 3.54 g, theoretical yield of trans-PBO: 3.04 g. Infrared analysis suggested that somewhat more than 50% of the amide bonds were converted to benzoxazole.

EXAMPLE 2

Reaction of the Polyanion of Poly-Terephthaloyl-Methylene-2-Chloro-Aniline with Copper(I)

Three g of poly[terephthaloylmethylene-bis-2- (-2-chloro-aniline] (inherent viscosity=0.38 dL/g) was reacted with 1.74 g of KH as a 35 wt. % suspension in mineral oil in 200 mL of DMSO to give the polyanion. The mineral oil was extracted from the reaction solution with pentane before the polymer was added. 3.12 g copper(I) bromide dimethyl sulfide complex was added as a solid, which caused the solution to gel. This reaction mixture was then refluxed for 8 hours, during which time solids formed in the reaction. The solids were isolated by filtration, washed with water, followed by dilute hydrochloric acid, then by water, and finally by acetone. The resulting solids were dried and found to be soluble in concentrated sulfuric acid. Inherent viscosity=0.74 dL/g. Infrared analysis showed predominant conversion to the polybenzoxazole with <5% of the amide bonds unconverted.

EXAMPLE 3

Reaction of the Potassium Salt of the Poly-2,4-difluoro-m-phenylene Terephthalamide Polyanion One and a half g of poly-2,4-difluoro-m-phenylene terephthalamide was reacted with 0.44 g of KH as a 35 wt. % suspension in mineral oil in 100 mL of DMSO to give the polyanion. The mineral oil was extracted from the reaction solution with pentane before the polymer was added. The resulting solution was refluxed under nitrogen for 16 hours. The solution was allowed to cool to room temperature and was then poured into an excess of water to precipitate the polymer. The polymer was isolated by filtration, washed with water and acetone and dried. Yield: 1.10 g. The polymer was soluble in concentrated sulfuric acid. Infrared analysis suggested that approximately 50% of the amide bonds had cyclized to benzoxazoles.

EXAMPLE 4

Reaction of the Lithium Salt of the Poly-2,4-difluoro-m-phenylene Terephthalamide Polyanion Half a g of poly-2,4-difluoro-m-phenylene terephthalamide (inherent viscosity=0.43 dL/g) was reacted with 0.19 g of LiNMe$_2$ in 35 mL of DMSO to generate the polyanion. The resulting solution was then refluxed for 24 hours, at which point the polymer was isolated by addition of the polymer to water. The solids were isolated by filtration, washed with water, dilute hydrochloric acid, water, then ether, and finally dried. Yield: 0.35 g, theoretical for cis-PBO: 0.43 g. The product had an infrared spectrum indistinguishable from authentic cis-PBO (polybenzoxazole) prepared by the literature method. Inherent viscosity=2.01 dL/g. The product was soluble in concentrated sulfuric acid and methane sulfonic acid, and contained residual fluorine (2.09%) and residual sulfur (1.01%), by microanalysis. Fluorine NMR suggested that small amounts of arylfluorine bonds remained.

EXAMPLE 5

Reaction of the Lithium Salt of the Poly-2,4-difluoro-m-phenylene Terephthalamide Polyanion Half a g of poly-2,4-difluoro-m-phenylene terephthalamide (inherent viscosity 2.16 dl/g in methane sulfonic acid) was reacted with 0.19 g lithium dimethylamide according to the procedure of Example 4, except it was refluxed for 72 hours. The resulting cis-PBO was isolated according to the procedure of Example 4. Infrared spectroscopy showed this to be cis-PBO with a trace of unconverted amide bonds. Inherent viscosity (methane sulfonic acid)=3.60 dL/g.

Although preferred embodiments of the invention have been described hereinabove, it is to be understood that there is no intention to limit the invention to the precise constructions herein disclosed, and it is to be further understood that the right is reserved to all changes coming within the scope of the invention as defined by the appended claims.

What is claimed is:

1. A polyamide anion comprising units of the formula

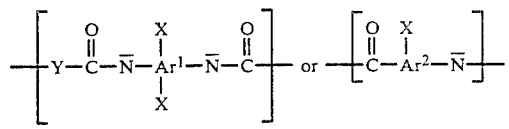

wherein:

each Y is independently hydrocarbylene or substituted hydrocarbylene;

each X is independently fluorine, chlorine, bromine or iodine;

$Ar^1$ is a tetravalent aromatic group in which each amido nitrogen is ortho to at least one of said X; and $Ar^2$ is a trivalent aromatic group in which the amido nitrogen is ortho to X.

2. The polyamide anion as recited in claim 1 wherein said $Ar^1$ is tetravalent benzene.

3. The polyamide anion as recited in claim 1 the positions of groups associated with said $Ar^1$ is

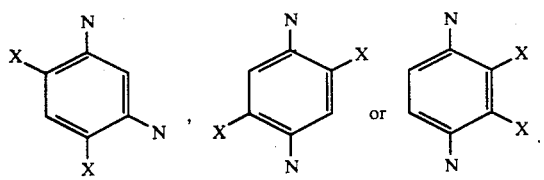

4. The polyamide anion as recited in claim 1 wherein the positions of groups associated with said $Ar^2$ is

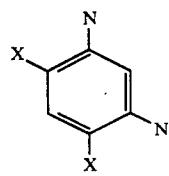

5. The polyamide anion as recited in claim 1 wherein said $Ar^2$ group is trivalent benzene.

6. The polyamide anion as recited in claim 1 wherein the positions of groups associated within said $Ar^2$ is

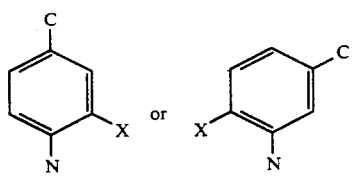

7. The polyamide anion as recited in claim 1 wherein said Y is normal alkylene.

8. The polyamide anion as recited in claim 1 wherein said Y is arylene.

9. The polyamide anion as recited in claim 8 wherein said Y is p-phenylene or m-phenylene.

10. The polyamide anion as recited in claim 3 wherein said Y is p-phenylene or m-phenylene.

11. The polyamide anion as recited in claim 1 wherein said X is fluorine or chlorine.

12. The polyamide anion as recited in claim 10 wherein said X is fluorine or chlorine.

13. A polyamide anion as recited in claim 1 wherein the counteranion is an alkali metal ion or cuprous ion.

14. A polyamide anion as recited in claim 12 wherein the counterion is an alkali metal ion or cuprous ion.

15. The polyamide anion as recited in claim 13 wherein said counterion is lithium.

16. The polyamide anion as recited in claim 14 wherein said counterion is cuprous, and said X is chlorine.

17. The polyamide anion as recited in claim 14 wherein said counterion is lithium and said X is fluorine.

18. A solution of a polyamide anion comprising a solvent and a polyamide anion comprising units of the formula

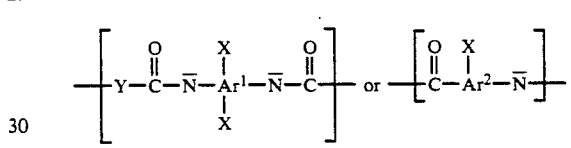

wherein:
each Y is independently hydrocarbylene or substituted hydrocarbylene;

each X is independently fluorine, chlorine, bromine or iodine;

$Ar^1$ is a tetravalent aromatic group in which each amido nitrogen is ortho to at least one of said X; and $Ar^2$ is a trivalent aromatic group in which the amido nitrogen is ortho to X.

19. The solution of the polyamide anion as recited in claim 18 wherein the solvent is a dialkylsulfoxide containing four carbon atoms or less in each alkyl group.

20. The solution of the polyamide anion as recited in claim 19 wherein said dialkylsulfoxide is dimethylsulfoxide.

* * * * *